US011641407B2

(12) United States Patent
Shah

(10) Patent No.: US 11,641,407 B2
(45) Date of Patent: May 2, 2023

(54) METHODS AND SYSTEMS FOR IMPLEMENTING COMMUNICATIONS BETWEEN A MANAGEMENT CONTROLLER AND A NETWORK CONTROLLER VIA AN NC-SI THAT UTILIZES IP CONNECTIVITY

(71) Applicant: Pensando Systems Inc., Milpitas, CA (US)

(72) Inventor: Dhruval Shah, Fremont, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 40 days.

(21) Appl. No.: 17/179,306

(22) Filed: Feb. 18, 2021

(65) Prior Publication Data

US 2022/0263916 A1 Aug. 18, 2022

(51) Int. Cl.

| | |
|---|---|
| ***G06F 15/173*** | (2006.01) |
| ***H04L 67/00*** | (2022.01) |
| ***H04L 67/06*** | (2022.01) |
| ***H04L 69/08*** | (2022.01) |

(52) U.S. Cl.

CPC .............. *H04L 67/34* (2013.01); *H04L 67/06* (2013.01); *H04L 69/08* (2013.01)

(58) Field of Classification Search

CPC .......... H04L 67/34; H04L 67/06; H04L 69/08

See application file for complete search history.

(56) References Cited

U.S. PATENT DOCUMENTS

| | | | |
|---|---|---|---|
| 10,148,746 B2 | 12/2018 | Itkin et al. | |
| 10,776,286 B1 * | 9/2020 | Kulchytskyy | G06F 8/65 |
| 2015/0334018 A1 * | 11/2015 | Kutch | H04L 45/745 370/254 |
| 2016/0134559 A1 | 5/2016 | Abel et al. | |
| 2017/0155573 A1 | 6/2017 | Khemani et al. | |
| 2019/0273700 A1 | 9/2019 | Itkin | |
| 2020/0311008 A1 | 10/2020 | Saha et al. | |

FOREIGN PATENT DOCUMENTS

EP 2669811 A1 12/2013

OTHER PUBLICATIONS

European Search Report for European Patent Application No. EP 22157323.1 dated Jun. 27, 2022; 2 pages.

DMTF: "Network Controller Sideband Interface (NC-SI) Specification", DSP0222, Version: 1.1.0, Sep. 23, 2015, 138 pgs.

DMTF: "Management Component Transport Protocol (MCTP) Base Specification", DSP0236, Version: 1.3.1, Sep. 4, 2019, 95 pgs.

(Continued)

*Primary Examiner* — Thanh T Nguyen

(74) *Attorney, Agent, or Firm* — Loza & Loza, LLP

(57) ABSTRACT

Methods and systems for implementing communications between a Management Controller (MC) and a Network Controller (NC) are disclosed. Embodiments of the present technology may include a method for implementing communications between an MC and an NC that involves establishing Internet Protocol (IP) connectivity between the MC and the NC using Network Controller Sideband Interface (NC-SI) control packets and communicating between the MC and the NC via an NC-SI and the established IP connectivity.

18 Claims, 15 Drawing Sheets

(56) References Cited

OTHER PUBLICATIONS

DMTF: "Management Component Transport Protocol (MCTP) SMBus/I2C Transport Binding Specification", DSP0237, Version: 1.2.0, Apr. 6, 2020, 37 pgs.
DMTF: "Management Component Transport Protocol (MCTP) PCIe VDM Transport Binding Specification", DSP0238, Version: 1.1.0, Nov. 29, 2018, 21 pgs.
DMTF: "NC-SI over MCTP Binding Specification", DSP0261, Version: 1.2.2, Sep. 24, 2019, 35 pgs.
Hewlett Packard: "Redfish API implementation on HPE servers with iLO RESTful API", Technical Paper, 2017, 9 pgs.
Autor, Jeff, "Introduction to Redfish", DMTF Scalable Platforms Management Forum, May 2015, 13 pgs.
Shah, Hemal, "DMTF Standards for OCP Platforms Management", OCP Summitt, San Jose, Mar. 20-21, 2018, 15 pgs.
Hilland, Jeff, "Redfish & RDE For Storage", Distinguished Technologist Manageability, Hewlett Packard Enterprise, 2018, 33 pgs.
Thomson, S. et al. "IPv6 Stateless Address Autoconfiguration", Request for Comments: 4862, Sep. 2007, 30 pgs.
Zhang, Rongqiang, "Bringing the OpenBMC for Platform Management System in Telco Cloud", Master's Thesis Apr. 30, 2019, 88 pgs.

* cited by examiner

646

| Bytes | Bits 31..24 | 23..16 | 15..8 | 7..0 |
|---|---|---|---|---|
| 00..15 | NCSI Header | | | |
| 16..19 | Response Code | | Reason Code | |
| 20..23 | Manufacturer ID (IANA) 0x0TBD | | | |
| 24..27 | OEM Command Type (0x0001 For GetCpuUsageInfo Feature) | | Cmd Length | Cmd Version |
| 28.. | Cmd Specific Data (If Any) | | | |
| XX..XX+3 | Checksum | | | |

FIG. 6A

| | Bits | | | |
|---|---|---|---|---|
| Bytes | 31..24 | 23..16 | 15..8 | 7..0 |
| 00..15 | NCSI Header | | | |
| 16..19 | Response Code | | Reason Code | |
| 20..23 | Manufacturer ID (IANA) 0x0TBD | | | |
| 24..27 | OEM Command Type (0x0001 For GetCpuUsageInfo Feature) | | Response Length | Response Version |
| 28..31 | Number Of CPUs | Reserved | | |
| 31.. | CPU0 User Time | CPU0 Sys Time | CPU0 Idle Time | CPU0 Iowait Time |
| | CPU1 User Time | CPU1 Sys Time | CPU1 Idle Time | CPU1 Iowait Time |
| | CPU2 User Time | CPU2 Sys Time | CPU2 Idle Time | CPU2 Iowait Time |
| | CPU3 User Time | CPU3 Sys Time | CPU3 Idle Time | CPU3 Iowait Time |
| | ... | ... | ... | ... |
| | CPU15 User Time | CPU15 Sys Time | CPU15 Idle Time | CPU15 Iowait Time |
| XX..XX+3 | Checksum | | | |

METHODS AND SYSTEMS FOR IMPLEMENTING COMMUNICATIONS BETWEEN A MANAGEMENT CONTROLLER AND A NETWORK CONTROLLER VIA AN NC-SI THAT UTILIZES IP CONNECTIVITY

FIELD OF THE INVENTION

Embodiments disclosed herein relate to computer networks, cloud computing, data warehouses, data center operations and management, network interface controllers, network interface cards, network appliances, routers, switches, load balancers, packet processing pipelines, and to communications between a Management Controller and a Network Controller.

BACKGROUND

A Baseboard Management Controller (BMC), also referred to as simply a Management Controller (MC), is a specialized service processor that is typically located on a printed circuit board (PCB) of a network server and used to monitor the physical state of components of the network server. For example, the BMC receives information from sensors that are located on components, referred to Network Controllers (NCs), such as Network Interface Cards (NICs). The sensors often measure internal physical variables of the components such as temperature, humidity, power-supply voltage, fan speeds, communications parameters, and operating system functions. An interface between a BMC and an NC has been standardized by the Distributed Management Task Force (DTMF) and published as the Network Controller Sideband Interface (NC-SI) specification. Although the NC-SI specification enables communication of information according to specific formats, the NC-SI has limited flexibility.

SUMMARY

Embodiments of the present technology may include a method for implementing communications between a Management Controller (MC) and a Network Controller (NC), the method including establishing Internet Protocol (IP) connectivity between the MC and the NC using Network Controller Sideband Interface (NC-SI) control packets. Embodiments may also include communicating between the MC and the NC via an NC-SI and the established IP connectivity.

In some embodiments, the NC-SI control packets are encapsulated in Ethernet headers with an EtherType field set to an NC-SI type. In some embodiments, the NC-SI control packets are encapsulated in Ethernet headers with an EtherType field set to a value of 0x88F8. In some embodiments, establishing IP connectivity between the MC and the NC using NC-SI control packets involves passing an IP address from the MC to the NC via an NC-SI control packet.

In some embodiments, establishing IP connectivity between the MC and the NC using NC-SI control packets involves utilizing the NC-SI control packets to trigger IPv6 stateless autoconfiguration functionality between the MC and the NC. In some embodiments, the NC-SI control packets include NC-SI command packets and NC-SI response packets. In some embodiments, communicating between the MC and the NC via the NC-SI and the established IP connectivity involves transmitting packets that are encapsulated in Ethernet headers with an EtherType field set to other than an NC-SI type.

In some embodiments, communicating between the MC and the NC via the NC-SI and the established IP connectivity involves transmitting packets that are encapsulated in Ethernet headers with an EtherType field set to a value other than 0x88F8. In some embodiments, communicating between the MC and the NC via the NC-SI and the established IP connectivity involves implementing a RESTful service between the MC and NC via the NC-SI and the established IP connectivity.

In some embodiments, the RESTful service utilizes REST API requests and REST API responses. In some embodiments, communicating between the MC and the NC via the NC-SI and the established IP connectivity involves communicating a firmware image update from the MC to the NC via the NC-SI and the established IP connectivity. In some embodiments, the firmware update is communicated from the MC to the NC via the NC-SI and the established IP connectivity using File Transfer Protocol (FTP).

In some embodiments, the firmware update is communicated from the MC to the NC via the NC-SI and the established IP connectivity using Network File System (NFS). In some embodiments, communicating between the MC and the NC via the NC-SI and the established IP connectivity involves communicating a log file from the NC to the MC via the NC-SI and the established IP connectivity. In some embodiments, NC-SI packets are communicated between the MC and the NC using NC-SI over Reduced Media Independent Interface (RMII). In some embodiments, NC-SI packets are communicated between the MC and the NC using NC-SI over Reduced Media Independent Interface (RMII) based transport (RBT). In some embodiments, NC-SI packets are communicated between the MC and the NC using NC-SI over MCTP over I2C. In some embodiments, NC-SI packets are communicated between the MC and the NC using NC-SI over MCTP over PCIe.

Embodiments of the present technology may also include a system for implementing communications between a Management Controller (MC) and a Network Controller (NC), the system including a processor. Embodiments may also include a computer readable medium that stored instructions, which when executed by the processor, implement, establishing IP connectivity between the MC and the NC using Network Controller Sideband Interface (NC-SI) control packets. Embodiments may also include communicating between the MC and the NC via an NC-SI and the established IP connectivity.

Embodiments of the present technology may also include a network controller (NC), the NC including an internal host interface. Embodiments may also include an external network interface. Embodiments may also include a Network Controller Sideband Interface (NC-SI). Embodiments may also include a processing element configured to, establish IP connectivity with a Management Controller (MC) using NC-SI control packets. Embodiments may also include communicate with the MC via the NC-SI and the established IP connectivity.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6A depicts an example of a custom NC-SI control packet that includes a custom NC-SI command.

FIG. 6B depicts an example of a custom NC-SI control packet that includes a custom NC-SI response.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to “one embodiment”, “an embodiment”, or similar language means that a particular feature, structure, or characteristic described in connection with the indicated embodiment is included in at least one embodiment of the present invention. Thus, the phrases “in one embodiment”, “in an embodiment”, and similar language throughout this specification may, but do not necessarily, all refer to the same embodiment.

Figure 1:
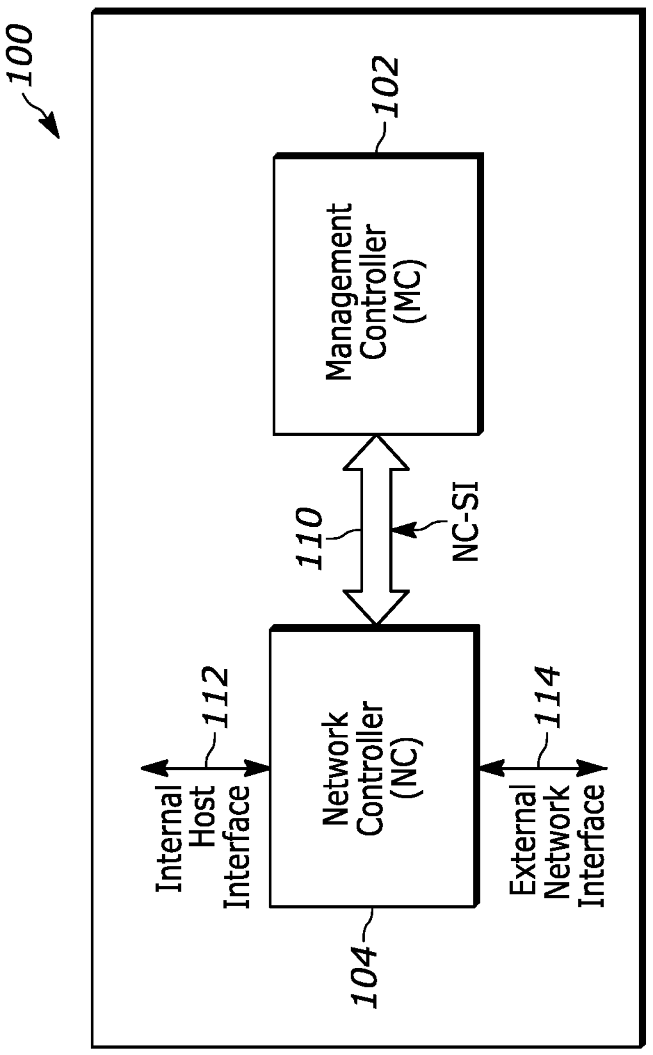
FIG. 1 is a functional block diagram of a system in which an MC and an NC communicate via an NC-SI.

The NC-SI specification (e.g., Document Identifier: DSP0222, Sep. 23, 2015, Version 1.1.0) specifies an interface for out-of-band management between an MC and an NC. The NC-SI specification addresses electrical and protocol specifications as well as system level behaviors for the MC and the NC related to the NC-SI. FIG. 1 is a functional block diagram of a system 100 in which an MC 102 and an NC 104 communicate via an NC-SI 110. As shown in FIG. 1, the MC and the NC communicate bidirectionally via the NC-SI and the NC includes an internal host interface 112 and an external network interface 114. In an embodiment, the MC is referred to as a BMC and the NC is a network interface card/network interface controller (NIC), such as a SmartNIC.

Figure 2:
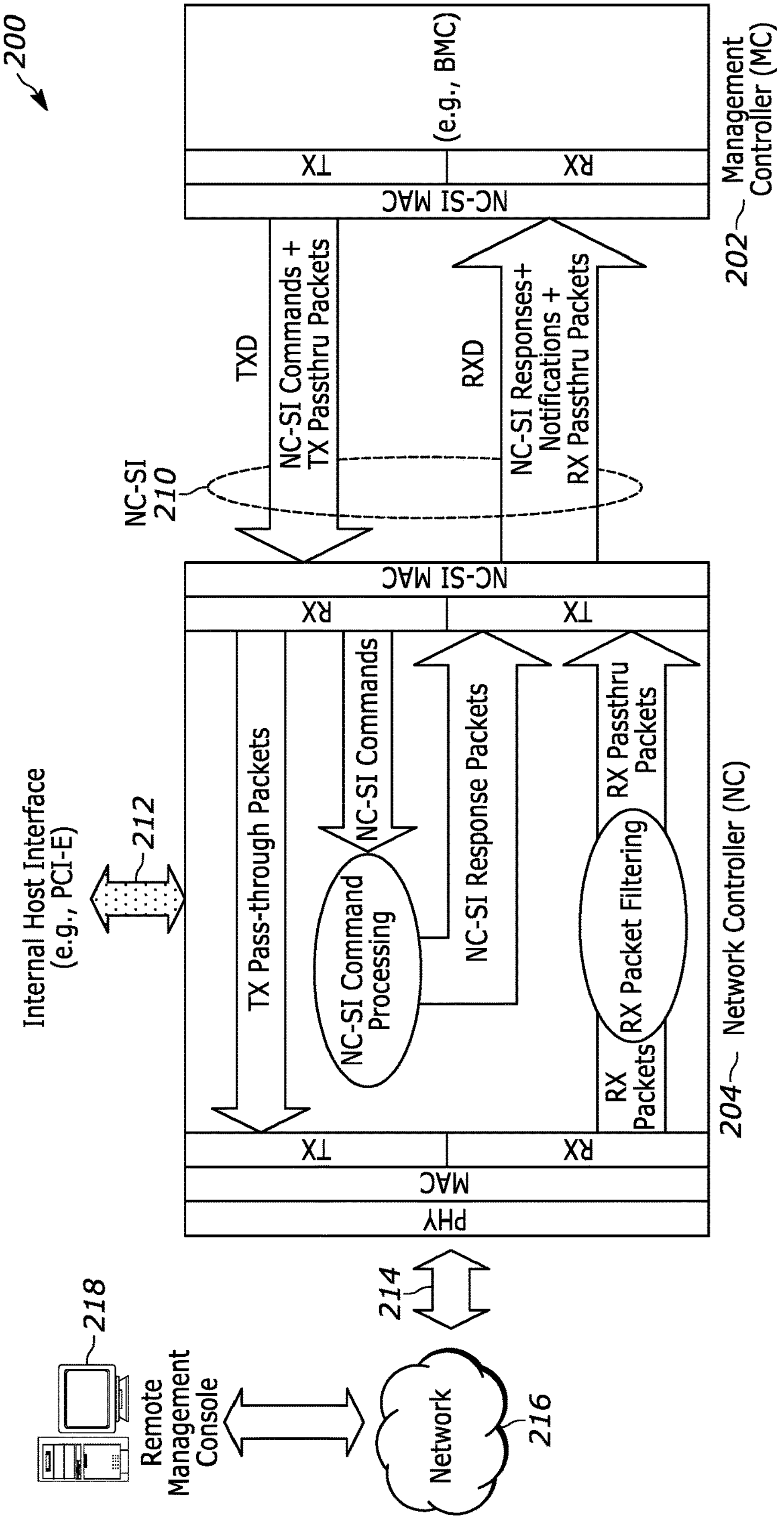
FIG. 2 is a traffic flow diagram of a system that illustrates communications between an MC and an NC via an NC-SI.

FIG. 2 is a traffic flow diagram of a system 200 that illustrates communications between an MC 202 and an NC 204 via an NC-SI 210. FIG. 2 also depicts an internal host interface 212 of the NC, a network 216 (e.g., a LAN or WAN) that is accessed by the NC via an external network interface 214, and a remote management console 218. As is known in the field, the NC-SI includes a transmit component (TX), a receive component (RX), and an NC-SI MAC at the MC (e.g., a BMC) and an NC-SI MAC, a TX, and an RX at the NC. The external network interface of the NC includes a TX, an RX, a MAC, and a PHY. With respect to the NC-SI, FIG. 2 illustrates TX data (TXD) communicated from the MC to the NC as including NC-SI commands and TX pass-through packets and RX data (RXD) communicated from the NC to the MC that includes NC-SI responses, NC-SI notifications (e.g., Asynchronous Event Notifications (AENs)), and RX pass-through packets. NC-SI commands are processed within the NC and NC-SI responses are provided to the MC, TX pass-through packets are passed from the NC-SI of the NC to the external network interface of the NC, and packets received at the external network interface and identified as RX pass-through packets by RX packet filtering are passed to the NC-SI of the NC and eventually to the MC via the NC-SI. As illustrated in FIG.

2 and outlined in the NC-SI specification, an NC-SI accommodates both NC-SI command/response/notification packets and pass-through packets (both TX and RX pass-through packets).

Figure 3:
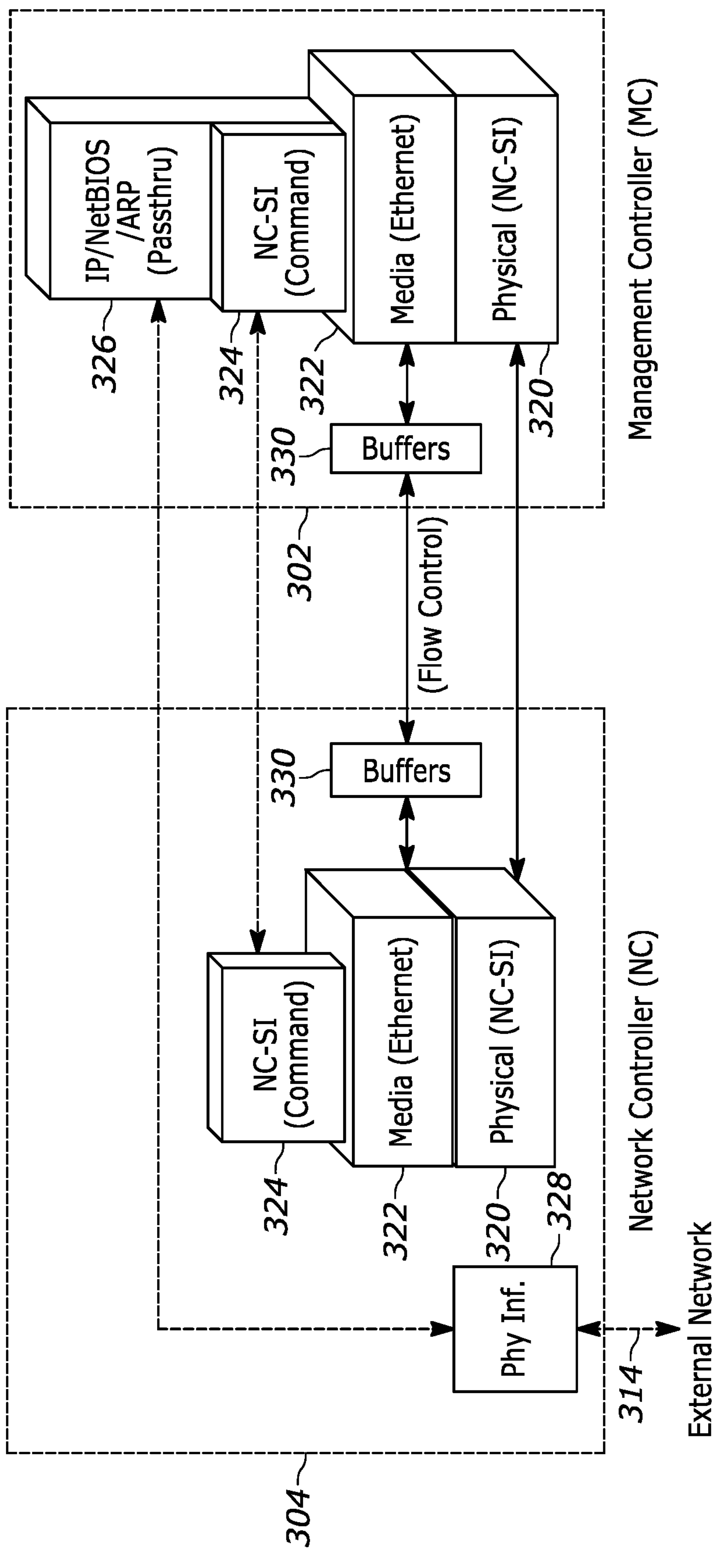
FIG. 3 graphically depicts the transport stack of an NC-SI between an MC and an NC.

FIG. 3 graphically depicts the transport stack of an NC-SI between an MC 302 and an NC 304. The layers of the transport stack include a physical layer 320 (which supports NC-SI), a media layer 322 (Ethernet), an NC-SI layer 324 (which is used for NC-SI commands (i.e., requests) and responses), and an IP/NetBIOS/Address Resolution Protocol (ARP) layer 326 (which is used for pass-through communications to an external network via a physical interface 328 of the external network interface 314). In particular, it is noted that that NC-SI layer is used to communicate NC-SI commands (i.e., requests) and NC-SI responses and NC-SI notifications while the IP/NetBIOS/ARP layer is used to communicate pass-through packets, including TX pass-through packets and RX pass-through packets. Additionally, the media layer may include buffers 330 for flow control and the physical layer may include NC-SI over Reduced Media Independent Interface (RMII), also known as RMII Based Transport (RBT), NC-SI over MCTP over SMBus/I2C, or NC-SI over MCTP over PCIe.

Figure 4:
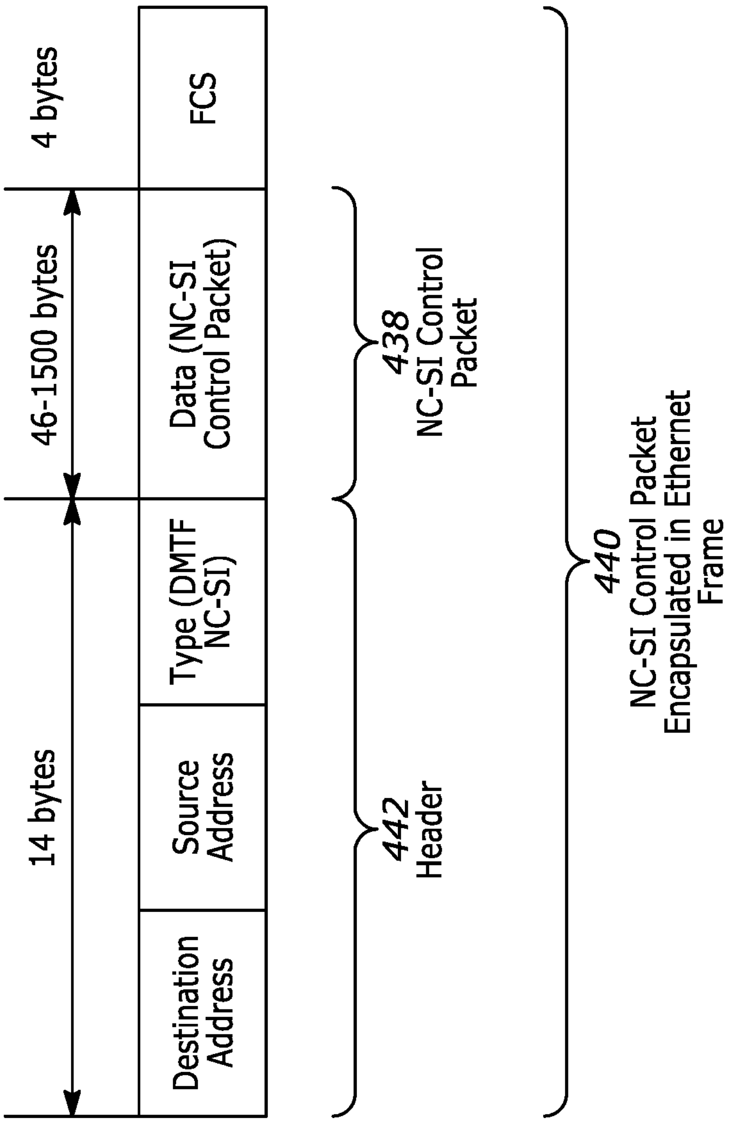
FIG. 4 depicts an NC-SI control packet that is encapsulated as the data portion of an Ethernet frame.

NC-SI commands (i.e., requests), NC-SI responses, and NC-SI notifications (i.e., AENs) are communicated in NC-SI control packets that are encapsulated in an Ethernet frame. FIG. 4 depicts an NC-SI control packet 438 that is encapsulated as the data portion of an Ethernet frame 440. In particular, the Ethernet frame includes a header 442 having a destination address (6 bytes), a source address (6 bytes), and a type field (2 bytes), a data field (ranging from 46-1,500 bytes), and a Frame Check Sequence (FCS) field (4 bytes). When an NC-SI control packet is encapsulated within an Ethernet frame, the type field (also referred to as the EtherType field) is set to a value that indicates that the Ethernet frame encapsulates an NC-SI control packet. According to the NC-SI specification, and as assigned by the IEEE, the EtherType field is set to a fixed value of 0x88F8. This value in the EtherType field enables NC-SI control packets to be differentiated from NC-SI pass-through packets. Additionally, for NC-SI control packets, the destination address may be set to a broadcast address (e.g., FF:FF:FF:FF:FF:FF) for consistency and the source address may be set to any value and may use, for example, FF:FF:FF:FF:FF:FF. Each NC-SI control packet includes a 16 byte header (not shown) and a variable length payload section (not shown). The particular format of command, response, and AEN packets is outlined in the NC-SI specification.

As described with reference to FIG. 4, an NC-SI control packet 440 has a specific value (e.g., 0x88F8) set in the EtherType field to identify the packet as an NC-SI control packet. NC-SI pass-through packets that are communicated between an MC and an NC have the EtherType field set to a value other than the fixed value of 0x88F8. NC-SI pass-through packets are typically used to communicate between the MC and a remote management console such as the remote management console 218 shown in FIG. 2.

Traditionally, an MC communicates with an NC to retrieve details about, for example, a Field Replaceable Unit (FRU), temperature, Link info, device/firmware status, etc. The MC can also configure some basic filters (e.g., MAC/Vlan filters) in the NC so that NC-SI pass-through packets can reach a remote management console via the external network interface of the NC (e.g., via the NC-SI pass-through path).

With the rise in functionality of NCs, such as SmartNICs, a wider range of functionality can be directed from the MC. In addition to traditional functionality, an MC can, for example, create/read/update/delete (CRUD) policies that are executed by a SmartNIC, install/update a firmware image and configure firmware parameters, recover the SmartNIC from a faulty status, and/or fetch a debug log (e.g., to enable tech support). Such additional functionality can be accomplished using an existing NC-SI between an MC and an NC, such as a SmartNIC. One conventional approach for leveraging an NC-SI to implement additional functionality beyond the standard functionality involves defining custom NC-SI control packets for each specific desired function. The custom NC-SI control packets carry custom NC-SI commands (i.e., requests), custom NC-SI responses, and custom NC-SI notifications. In some embodiments, different Original Equipment Manufacturers (OEMs) may develop their own OEM-specific set of custom NC-SI commands (i.e., requests), responses, and notifications to achieve desired functionality.

Figure 5:
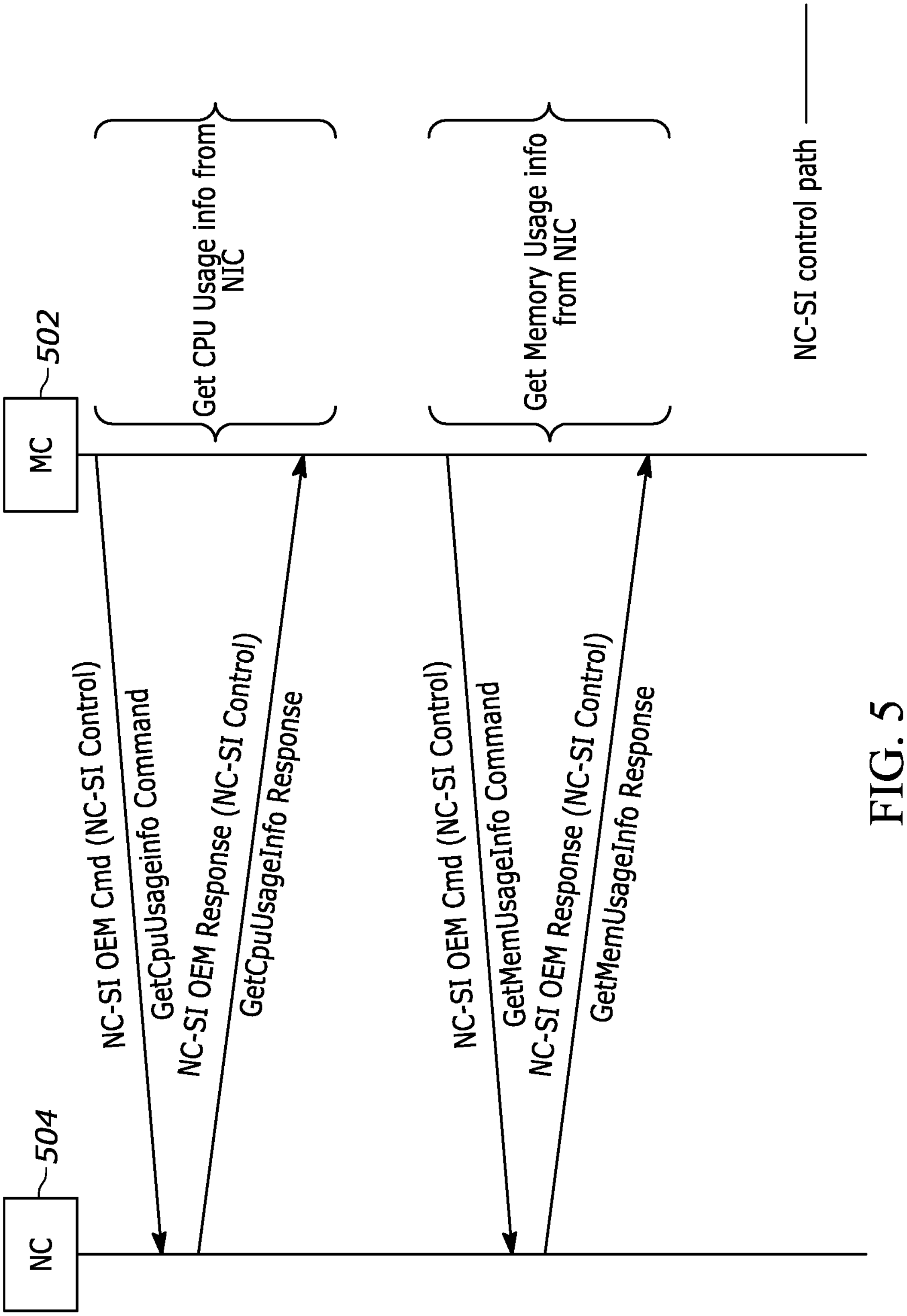
FIG. 5 illustrates how custom NC-SI commands and custom NC-SI responses can be used to implement extended functionality.

FIG. 5 illustrates how custom NC-SI commands and custom NC-SI responses can be used to implement extended functionality. In particular, FIG. 5 illustrates how CPU usage and memory usage of the NC (e.g., a SmartNIC) could be obtained from the NC via an NC-SI between the NC and an MC. With regard to CPU usage of the NC, the MC transmits a custom NC-SI control packet (e.g., NC-SI OEM Cmd), in which the custom NC-SI control packet includes a custom NC-SI command (e.g., GetCpuUsageInfo Command) in the payload section of the custom NC-SI control packet. In response to the custom NC-SI command, the NC transmits a custom NC-SI control packet (e.g., NC-SI OEM Response), in which the NC-SI control packet includes a custom NC-SI response (e.g., GetCpuUsageInfo Response). FIG. 6A depicts an example of a custom NC-SI control packet 646 that includes a custom NC-SI command (e.g., GetCpuUsageInfo) and FIG. 6B depicts an example of a custom NC-SI control packet 648 that includes a custom NC-SI response (e.g., GetCpuUsageInfo). In both the custom NC-SI command (i.e., request) and the custom NC-SI response, custom fields (e.g., fields that are not defined in the NC-SI specification) must be established to implement the extended functionality. Referring back to FIG. 5, with regard to memory usage, the MC transmits a custom NC-SI control packet (e.g., NC-SI OEM Cmd), in which the NC-SI control packet includes a custom NC-SI command (e.g., GetMemUsageInfo Command) in the payload section of the custom NC-SI control packet. In response to the custom NC-SI command, the NC transmits a custom NC-SI control packet (e.g., NC-SI OEM Response), in which the NC-SI control packet includes a custom NC-SI response (e.g., GetMemUsageInfo Response). Thus, in the case of memory usage, another set of custom NC-SI control packets, including a custom command (i.e., request) and a response similar to those depicted in FIGS. 6A and 6B, would need to be established.

As illustrated above with reference to FIGS. 5, 6A, and 6B, all of the communications used to implement the extended functionality of obtaining CPU usage and obtaining memory usage from the NC involve establishing custom NC-SI control packets. While such an approach is currently being used to implement extended functionality over an NC-SI, defining custom NC-SI control packets for each desired extended functionality, managing different versions of NC-SI commands/responses over time, and ensuring backward compatibility of the custom NC-SI control packets does not scale well and may prove to be impractical in the rapidly evolving field of network communications.

Additionally, using such a conventional approach, NIC OEMs and BMC OEMs would need to agree upon the format of each set of OEM-specific commands and responses. Such an approach would require a new OEM command/response definition for each and every feature that a SmartNIC exposes to a BMC, e.g., memory usage, security policy etc. The approach may lead to interoperability issues between OEMs of BMCs and NICs as all OEMs may not be able to agree upon one single format for the custom NC-SI commands/responses. Additionally, if a feature provides a large amount of data, then multiple custom NC-SI control packets may be needed just for one feature as NC-SI control packets have a maximum length of 1,500 bytes. The approach may also lead to increased design and development efforts for OEMs of both BMCs and NICs.

Another possible approach to implementing extended functionality between MCs and NCs is Redfish Device Enablement (RDE), which is being developed by the DMTF. RDE involves an intermediary controller that specifies certain Platform Data Records (PDRs). Although RDE may work well, there is still a need for a flexible communications between MCs and NCs.

In accordance with an embodiment of the invention, a technique for implementing communications between an MC and an NC involves establishing IP connectivity between the MC and the NC using NC-SI control packets and communicating between the MC and the NC via an NC-SI and the established IP connectivity. By first establishing IP connectivity between the MC and the NC and then using the established IP connectivity to communicate between the MC and the NC via the NC-SI, a wide range of extended functionality can be implemented via the NC-SI without having to use custom NC-SI control packets for each different function. In essence, the technique leverages the concept of the "pass-through" path or "pass-through" packets in the NC-SI specification by establishing IP connectivity between the MC and a processing element of the NC and then using NC-SI "local" pass-through packets to communicate information via traditional IP connectivity. Traditional IP packets may be used with higher layer protocols such TCP/UDP, HTTP, FTP, and NFS to provide flexible communication between an MC and an NC. The communications can be used to implement, for example, a RESTful service, firmware updates, log file transfers, and system configurations.

In an embodiment, IP connectivity is established between the MC and the NC using NC-SI control packets in which the EtherType field of the corresponding Ethernet frame is set to the NC-SI value of 0x88F8. In an embodiment, the MC transmits a custom NC-SI command that includes a local IP address for the NC and the NC responds with a custom NC-SI response that acknowledges the custom NC-SI command. In another embodiment, NC-SI control packets are used to trigger an IPv6 link local autoconfiguration process between the MC and the NC. Once IP connectivity is established between the MC and the NC, subsequent communications between the MC and the NC use the IP connectivity and therefore only one set of custom NC-SI packets (e.g., a custom NC-SI command (i.e., request) and custom NC-SI response) need to be defined to enable a wide variety of functionality. The rest of the communications are via NC-SI local pass-through packets.

The technique described herein can be used with NC-SI over Reduced Media Independent Interface (RMII), also known as RMII Based Transport (RBT), with NC-SI over MCTP over SMBus/I2C, or with NC-SI over MCTP over PCIe.

Figure 7A:
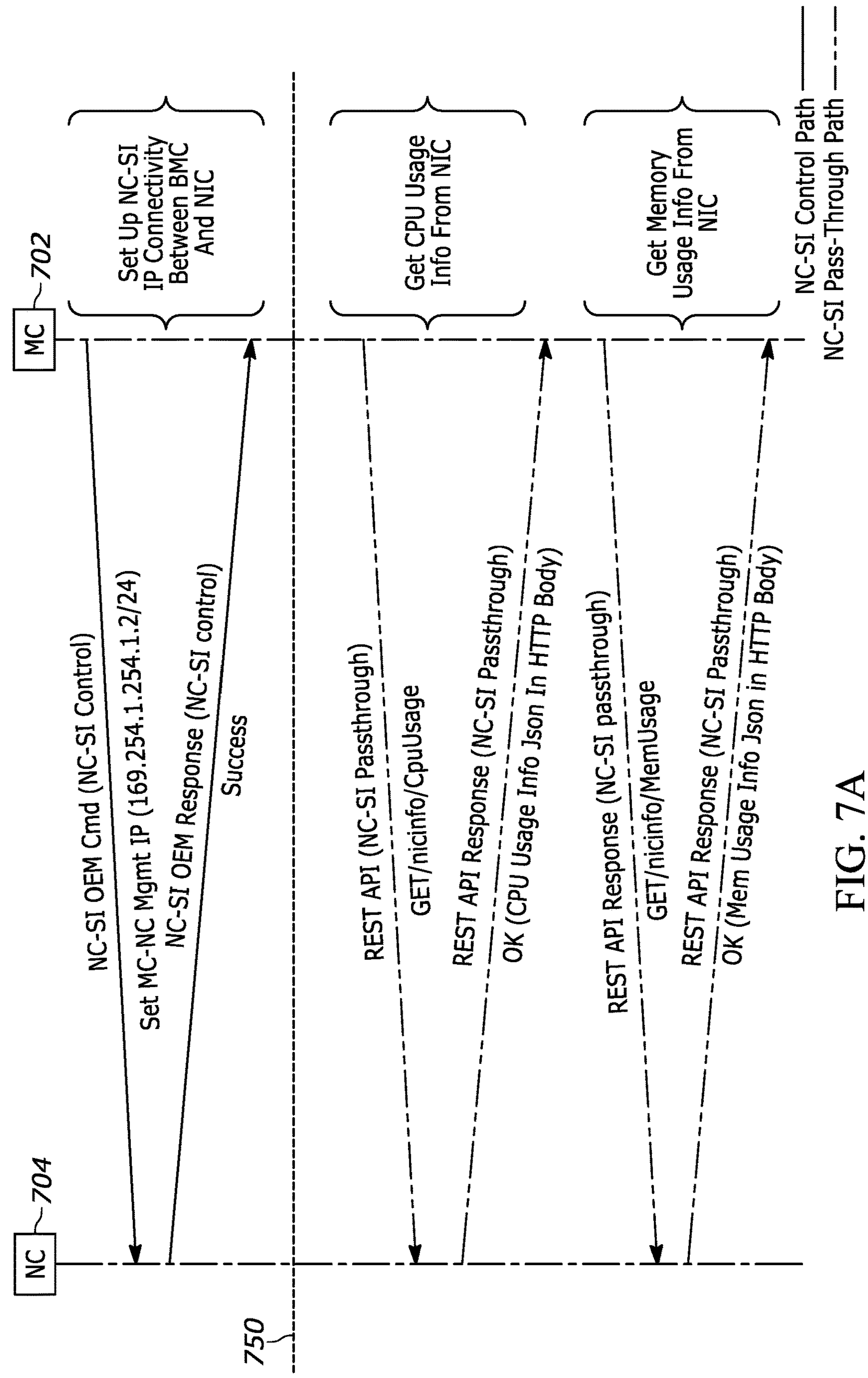
FIG. 7A illustrates packet traffic between an MC and an NC that is used to establish IP connectivity between the MC and the NC and to communicate between the MC and the NC via an NC-SI that utilizes the established IP connectivity.

FIG. 7A illustrates packet traffic between an MC 702 and an NC 704 that is used to establish IP connectivity between the MC and the NC and to communicate between the MC and the NC via an NC-SI that utilizes the established IP connectivity. In the example of FIG. 7A, the communications between the MC and the NC are used to communicate CPU usage of the NC and memory usage of the NC from the NC to the MC. For example, it may be desirable for a SmartNIC to provide CPU usage and memory usage information to a BMC of a host computing system in a data center. With reference to FIG. 7A, operations related to establishing IP connectivity are illustrated above the dashed line 750 and operations related to the communication of CPU usage and memory usage are illustrated below the dashed line 750.

Figure 7B:
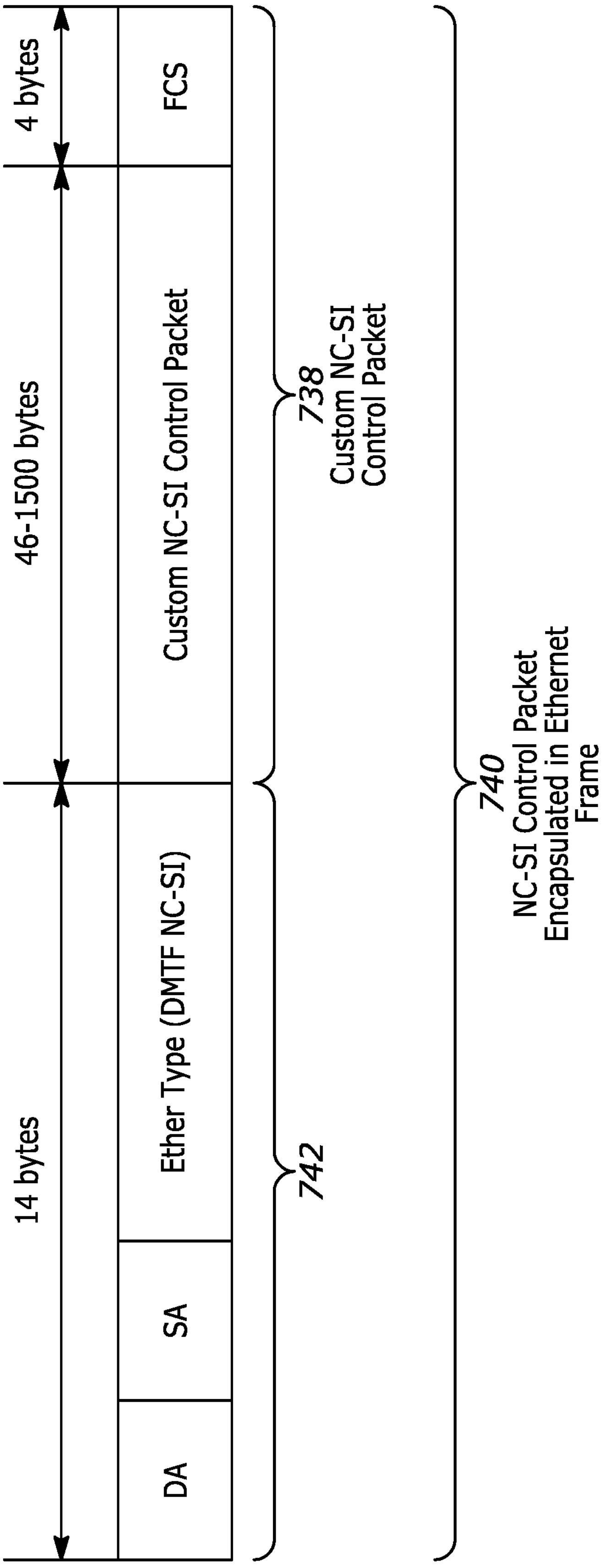
FIG. 7B depicts an example of a custom NC-SI control packet that is encapsulated in an Ethernet frame.

With regard to establishing IP connectivity, the MC 702 transmits a custom NC-SI control packet (e.g., NC-SI OEM Cmd) to the NC 704, in which the NC-SI control packet includes a custom NC-SI command (e.g., Set MC-NC Mgmt IP (169.254.1.2/24) in the payload section of the custom NC-SI control packet. For example, the MC provides a local IP address (e.g., 169.254.1.2/24) to the NC to use for the IP connectivity between the MC and the NC. In response to the custom NC-SI command, the NC transmits a custom NC-SI control packet (e.g., NC-SI OEM Response), in which the NC-SI control packet includes a custom NC-SI response (e.g., success) in the payload portion of the custom NC-SI control packet. FIG. 7B depicts an example of a custom NC-SI control packet 738 that is encapsulated in an Ethernet frame 740 in which the EtherType field of the Ethernet header 742 is set to 0x88F8 to identify that the Ethernet frame is carrying an NC-SI control packet. Custom NC-SI control packets can be used for both the custom NC-SI command (i.e., request) and the custom NC-SI response. The exchange of custom NC-SI control packets is used to establish IP connectivity between the MC and the NC. In an embodiment, IP connectivity between the MC and the NC involves NC-SI local pass-through packets that are communicated between an IP address (e.g., local IP address) of the MC and an IP address (e.g., a local IP address) of the NC. In the example of FIG. 7A, the advertisements and solicitations are communicated via NC-SI control packets. Once IP connectivity has been established between the MC and the NC, the CPU usage and memory usage functions can be implemented via the NC-SI utilizing the IP connectivity.

Figure 7C:
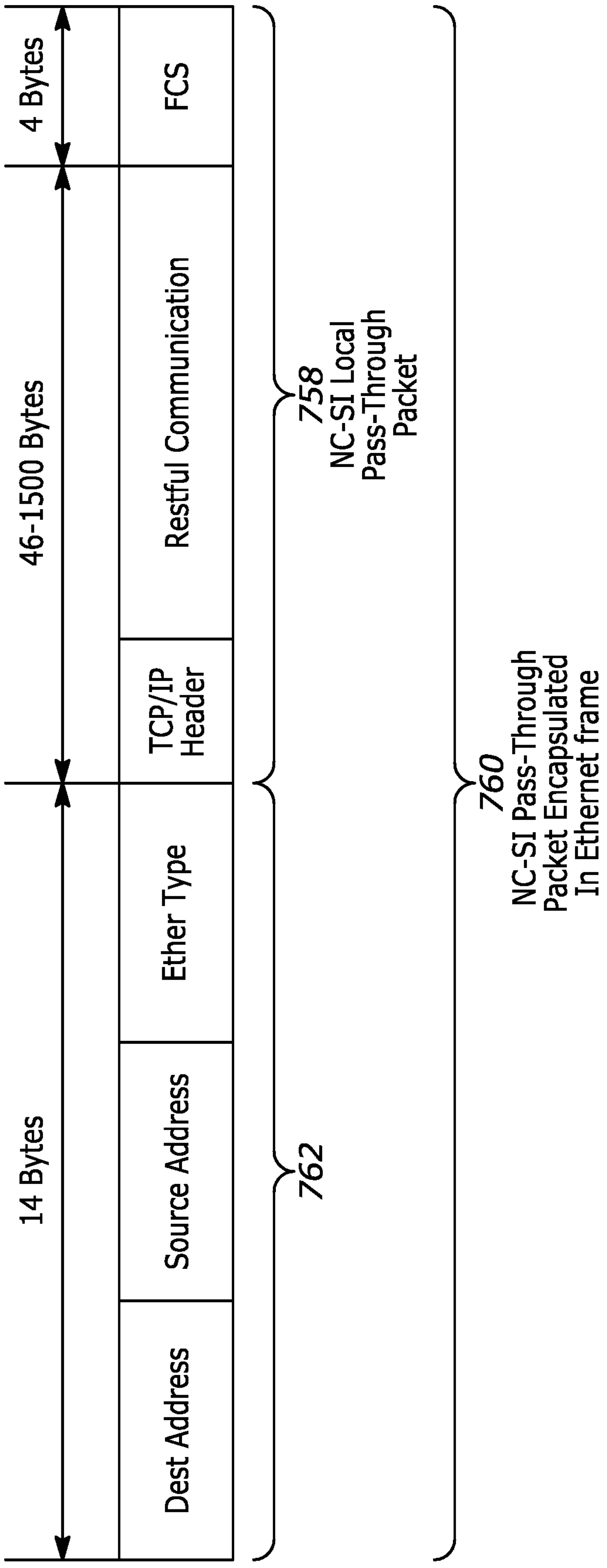
FIG. 7C depicts an example of an NC-SI local pass-through packet that is encapsulated in an Ethernet frame.

With regard to CPU usage of the NC 704, the MC 702 issues a request using a REST API that is sent to the NC using the IP connectivity, e.g., using an NC-SI local pass-through packet as opposed to an NC-SI control packet. For example, the request may be an HTTP GET command (e.g., GET/ncInfo/CpuUsage) that is carried in the payload section of an IP packet that is encapsulated in an Ethernet frame. In response to the request, the NC issues a response (e.g., REST API Response) using an NC-SI local pass-through packet, in which the response includes a REST API response (e.g., OK (CPU Usage info json in HTTP body)) in the payload section of an IP packet. FIG. 7C depicts an example of an NC-SI local pass-through packet 758 that is encapsulated in an Ethernet frame 760 in which the EtherType field of the Ethernet header 762 is set to a value other than the NC-SI value, e.g., other than to the value of 0x88F8. Because NC-SI local pass-through packets are used to communicate the request for CPU usage data and the response to the request (e.g., the CPU usage data), custom NC-SI control packets are not needed to communicate the CPU usage information.

Referring back to FIG. 7A and with regard to memory usage, the MC 702 issues a request using a REST API that is sent to the NC 704 using the IP connectivity, e.g., using an NC-SI local pass-through packet as opposed to an NC-SI control packet. For example, the request may be an HTTP GET command (e.g., GET/ncInfo/MemUsage) that is carried in the payload section of an IP packet that is encapsulated in an Ethernet frame. In response to the request, the NC issues a response (e.g., REST API Response) using an NC-SI local pass-through packet, in which the response includes a REST API response (e.g., OK (Mem Usage info json in HTTP body)) in the payload section of an IP packet. Again, FIG. 7C depicts an example of an NC-SI local pass-through packet 758 that is encapsulated in an Ethernet frame 760 in which the EtherType field of the Ethernet header 762 is set to a value other than the NC-SI value, e.g., other than to the value of 0x88F8. Such an NC-SI local pass-through packet encapsulated in an Ethernet frame in which the EtherType field is set to a value other than the NC-SI value, e.g., other than to the value of 0x88F8, can be used over the NC-SI to implement this transaction. Because NC-SI local pass-through packets are used to communicate the request for memory usage data and the response to the request (e.g., the memory usage data) over the NC-SI, custom NC-SI control packets are not needed to communicate the memory usage information.

As illustrated above with reference to FIG. 7A, NC-SI control packets are used to establish the IP connectivity between the MC and the NC. In another embodiment, IP connectivity can be established using IPv6 stateless autoconfiguration. For example, the technique for establishing IP connectivity utilizes the link local IPv6 stateless autoconfiguration protocol as defined in the IETF RFC 4862, September 2007. Using link local IPv6 stateless autoconfiguration, each interface on a local link (e.g., the network within a host server system) generates a unique link local IPv6 address using the hardware (e.g., MAC) address of the corresponding interface. By using neighbor advertisement and neighbor solicitation techniques, the interfaces exchange their IPv6 address and hardware addresses to other interfaces on the local link within the host server system. As described herein, to establish IP connectivity between the MC and the NC, the MC and NC exchange their link local IPv6 addresses to establish the IPv6 connectivity between the MC and NC. In an embodiment, to avoid leaking the IPv6 neighbor solicitation and neighbor advertisement messages out on the network, the MC and the NC exchange their MAC addresses (e.g., hardware addresses) of their NC-SI interface using NC-SI control packets. In an embodiment, the process is initiated by an NC-SI control packet from the MC. The MC-SI control packet includes its own MAC address in the NC-SI control packet to inform the NC that the NC should allow neighbor advertisement messages only from the MAC address of the MC. The NC uses the MAC address of the MC in the NC-SI control packet to install the filters in the NC (e.g., in the datapath of the NC) to allow IPv6 packets from only the MC's MAC address as the MAC source address in Ethernet packets. In addition, the NC responds to the NC-SI control packet from the MC with its own MAC address to inform MC that the MC should expect IPv6 neighbor advertisement and neighbor solicitation messages from the NC's MAC address only. In an embodiment, this exchange is important to ensure that the MC and the NC do not exchange their link local IPv6 addresses to any devices on an external network or any other unauthorized entity.

Figure 7D:
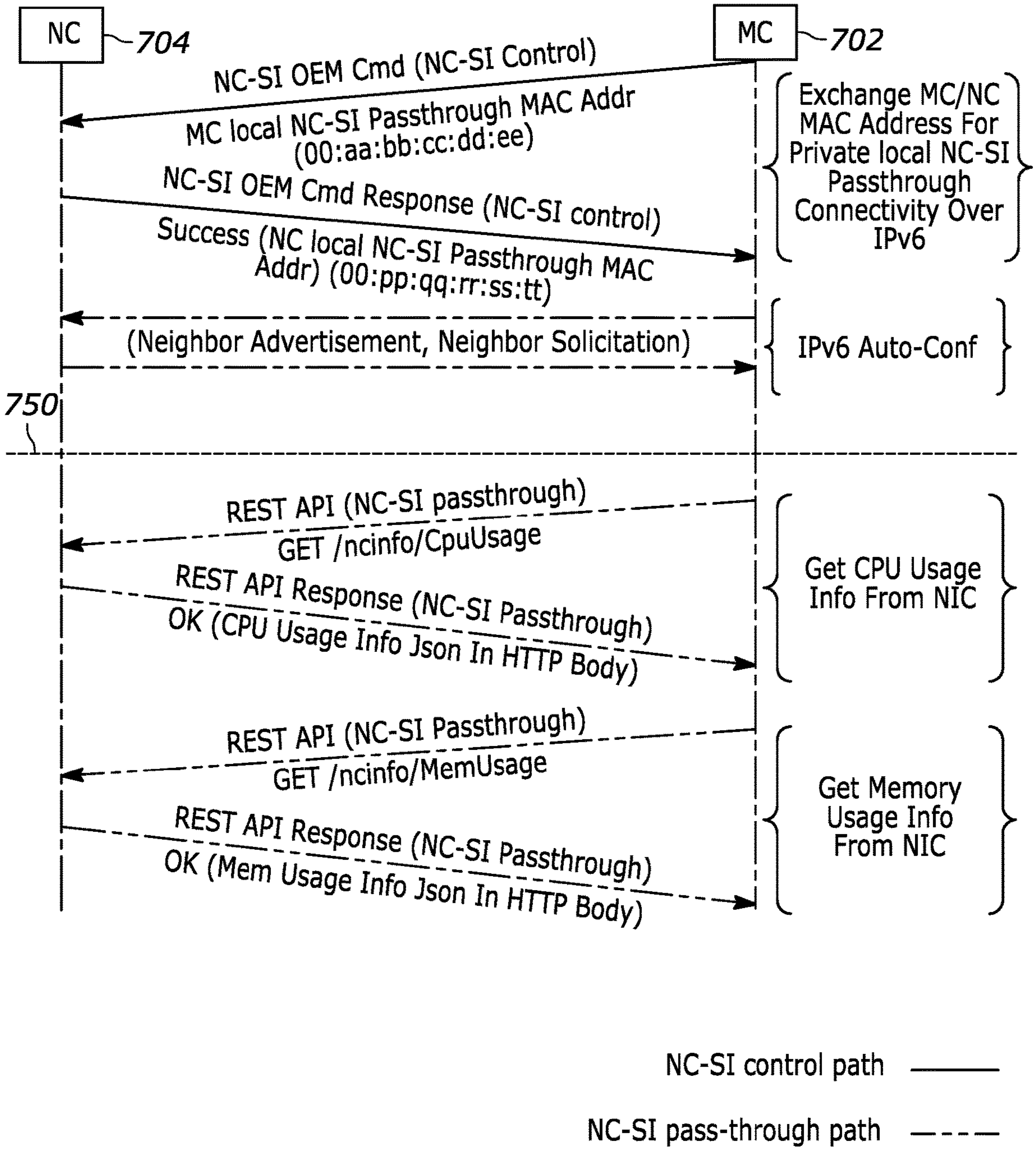
FIG. 7D illustrates packet traffic between the MC and the NC that is used to establish IP connectivity between the MC and the NC and to communicate between the MC and the NC via an NC-SI that utilizes the established IP connectivity.

FIG. 7D illustrates packet traffic between the MC 702 and the NC 704 that is used to establish IP connectivity between the MC and the NC and to communicate between the MC and the NC via an NC-SI that utilizes the established IP connectivity. In the example of FIG. 7D, the communications between the MC and the NC are used to communicate CPU usage of the NC and memory usage of the NC from the NC to the MC similar to the case described with reference to FIG. 7A. With reference to FIG. 7D, operations related to establishing IP connectivity are again illustrated above the dashed line 750 and operations related to the communication of CPU usage and memory usage are again illustrated below the dashed line 750.

With regard to establishing IP connectivity, the MC 702 transmits a custom NC-SI control packet (e.g., NC-SI OEM Cmd) to the NC 704, in which the NC-SI control packet includes a custom NC-SI command (e.g., MC local NC-SI passthrough MAC addr) in the payload section of the custom NC-SI control packet. For example, the MC provides a MAC address (e.g., 00:aa:bb:cc:dd:ee) of the NC-SI MAC to the NC to use for establishing IP connectivity between the MC and the NC. In response to the custom NC-SI command, the NC transmits a custom NC-SI control packet (e.g., Success (NC local NC-SI passthrough MAC addr), in which the NC-SI control packet includes a custom NC-SI response (e.g., including the NC-SI MAC address 00:pp:qq:rr:ss:tt) in the payload portion of the custom NC-SI control packet. As with the case of FIG. 7A, FIG. 7B depicts an example of a custom NC-SI control packet 738 that is encapsulated in an Ethernet frame 740 in which the EtherType field of the Ethernet header 742 is set to 0x88F8 to identify that the Ethernet frame is carrying an NC-SI control packet. Custom NC-SI control packets can be used for both the custom NC-SI command (i.e., request) and the custom NC-SI response. The exchange of custom NC-SI control packets is used to trigger an IPv6 autoconfiguration operation. As illustrated in FIG. 7D, the IPv6 autoconfiguration operation involves neighbor advertisements and neighbor solicitations. Once the IPv6 autoconfiguration is complete, IP connectivity is established between the MC and the NC and the CPU usage and memory usage functions can be implemented via the NC-SI utilizing the IP connectivity.

With regard to CPU usage of the NC 704, the MC 702 issues a request using a REST API that is sent to the NC using the IP connectivity, e.g., using an NC-SI local pass-through packet as opposed to an NC-SI control packet. For example, the request may be an HTTP GET command (e.g., GET/ncInfo/CpuUsage) that is carried in the payload section of an IP packet that is encapsulated in an Ethernet frame. In response to the request, the NC issues a response (e.g., REST API Response) using an NC-SI local pass-through packet, in which the response includes a REST API response (e.g., OK (CPU Usage info json in HTTP body)) in the payload section of an IP packet. FIG. 7C depicts an example of an NC-SI local pass-through packet 758 that is encapsulated in an Ethernet frame 760 in which the EtherType field of the Ethernet header 762 is set to a value other than the NC-SI value, e.g., other than to the value of 0x88F8. Because NC-SI local pass-through packets are used to communicate the request for CPU usage data and the response to the request (e.g., the CPU usage data), custom NC-SI control packets are not needed to communicate the CPU usage information.

Referring back to FIG. 7D and with regard to memory usage, the MC 702 issues a request using a REST API that is sent to the NC 704 using the IP connectivity, e.g., using an NC-SI local pass-through packet as opposed to an NC-SI control packet. For example, the request may be an HTTP GET command (e.g., GET/ncInfo/MemUsage) that is carried in the payload section of an IP packet that is encapsulated in an Ethernet frame. In response to the request, the NC issues a response (e.g., REST API Response) using an NC-SI local pass-through packet, in which the response includes a REST API response (e.g., OK (Mem Usage info j son in HTTP body)) in the payload section of an IP packet. Again, FIG. 7C depicts an example of an NC-SI local pass-through packet 758 that is encapsulated in an Ethernet frame 760 in which the EtherType field of the Ethernet header 762 is set to a value other than the NC-SI value, e.g., other than to the value of 0x88F8. Such an NC-SI local pass-through packet encapsulated in an Ethernet frame in which the EtherType field is set to a value other than the NC-SI value, e.g., other than to the value of 0x88F8, can be used over the NC-SI to implement this transaction. Because NC-SI local pass-through packets are used to communicate the request for memory usage data and the response to the request (e.g., the memory usage data) over the NC-SI, custom NC-SI control packets are not needed to communicate the memory usage information.

Figure 8A:
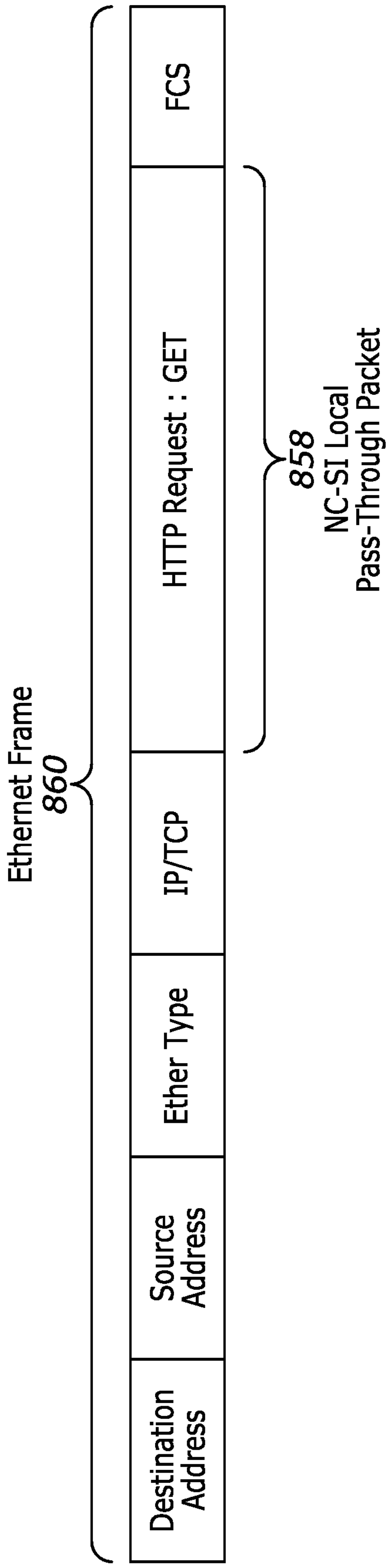
FIG. 8A depicts an example request that could be used for a CPU usage request or a memory usage request as illustrated in FIGS. 7A and 7D.
Figure 8B:
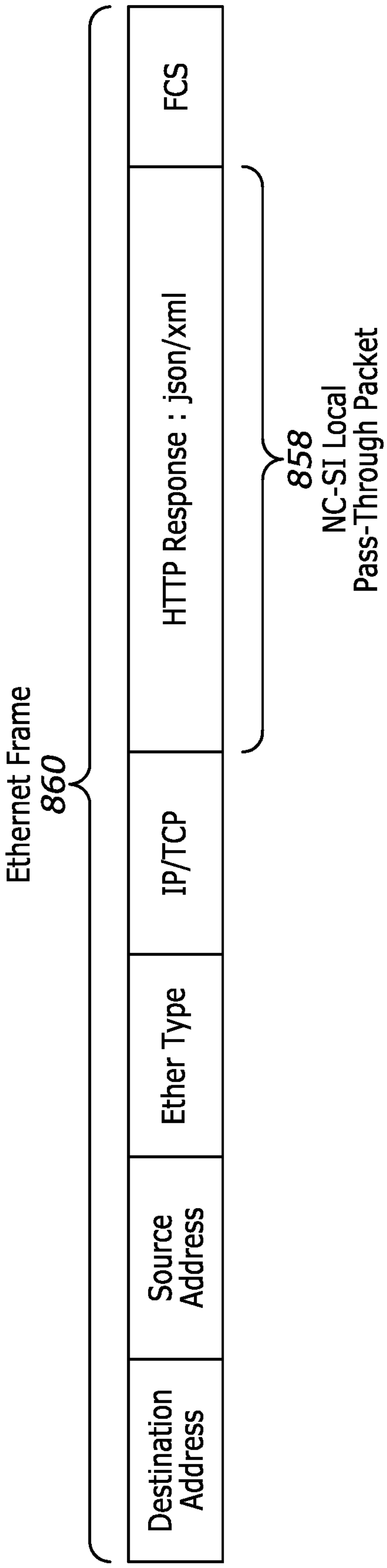
FIG. 8B depicts an example response that could be used for a CPU usage response or a memory usage response as illustrated in FIGS. 7A and 7D.

As illustrated above with reference to FIGS. 7A-7D, only the communications used to establish the IP connectivity involve custom NC-SI control packets. Once IP connectivity is established, the CPU usage and memory usage functionality can be implemented by communicating IP-based NC-SI local pass-through packets between the MC 702 and the NC 704. FIG. 8A depicts an example request that could be used for the CPU usage request or the memory usage request as illustrated in FIGS. 7A and 7D. The request is carried in an NC-SI local pass-through packet 858 that is encapsulated in an Ethernet frame 860. The request includes an HTTP Request (e.g., a GET request) in the payload portion of an IP packet. FIG. 8B depicts an example response that could be used for the CPU usage response or the memory usage response as illustrated in FIGS. 7A and 7D. The response is also carried in an NC-SI local pass-through packet 858 that is encapsulated in an Ethernet frame 860. The response includes an HTTP Response (e.g., data in json or xml format) in the payload portion of an IP packet. In an embodiment, CPU usage information about 16 different CPU cores is provided in json format as:

```
{
"Desc": "cpu_info",
"cpus": [
{ "name":"cpu0", "user":10, "system":35, "idle": 50, "ioweight": 5 },
{ "name":"cpu1", "user":20, "system":25, "idle": 50, "ioweight": 5 },
{ "name":"cpu2", "user":30, "system":15, "idle": 50, "ioweight": 5 },
{ "name":"cpu3", "user":30, "system":15, "idle": 50, "ioweight": 5 },
{ "name":"cpu4", "user":30, "system":15, "idle": 50, "ioweight": 5 },
{ "name":"cpu5", "user":30, "system":15, "idle": 50, "ioweight": 5 },
{ "name":"cpu6", "user":30, "system":15, "idle": 50, "ioweight": 5 },
{ "name":"cpu7", "user":30, "system":15, "idle": 50, "ioweight": 5 },
{ "name":"cpu8", "user":30, "system":15, "idle": 50, "ioweight": 5 },
{ "name":"cpu9", "user":30, "system":15, "idle": 50, "ioweight": 5 },
{ "name":"cpu10", "user":30, "system":15, "idle": 50, "ioweight": 5 },
{ "name":"cpu11", "user":30, "system":15, "idle": 50, "ioweight": 5 },
{ "name":"cpu12", "user":30, "system":15, "idle": 50, "ioweight": 5 },
{ "name":"cpu13", "user":30, "system":15, "idle": 50, "ioweight": 5 },
{ "name":"cpu14", "user":30, "system":15, "idle": 50, "ioweight": 5 },
{ "name":"cpu15", "user":40, "system":5, "idle": 50, "ioweight": 5 }
  ]
  }
```

Although FIGS. 8A and 8B depict an example request and response of a RESTful service, data may be communicated within the IP-based local pass-through packets using other higher layer protocols, including UDP, FTP, and NFS.

Figure 9:
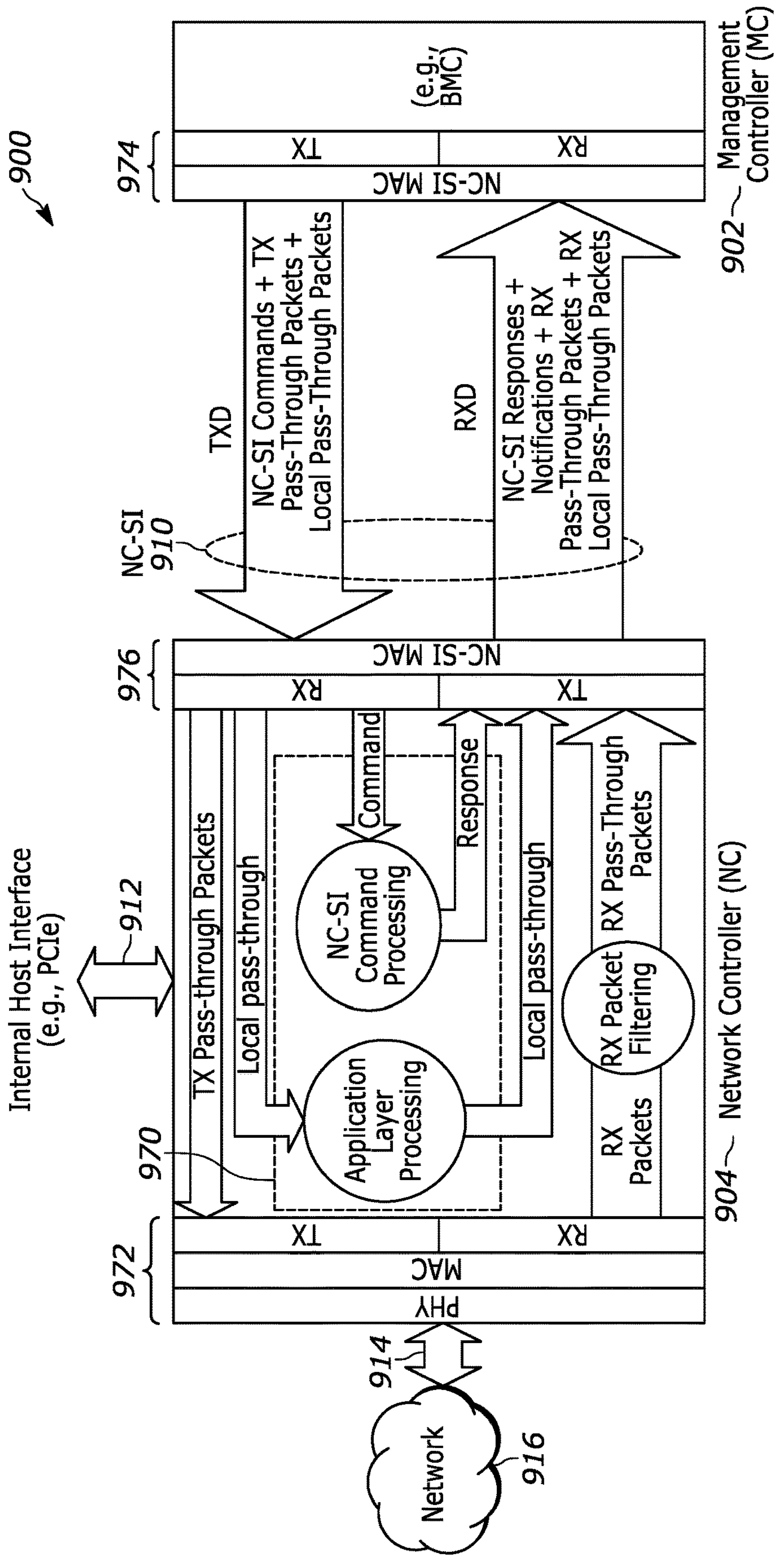
FIG. 9 is a traffic flow diagram of a system that illustrates communications between an MC and an NC via an NC-SI.

FIG. 9 is a traffic flow diagram of a system 900 that illustrates communications between an MC 902 and an NC 904 via an NC-SI 910. FIG. 9 is similar to FIG. 2 except that FIG. 9 also illustrates communications between the MC and the NC via the NC-SI that utilize IP connectivity to implement an NC-SI local pass-through path between the MC and a processing element 970 of the NC. In particular, FIG. 9 illustrates an NC-SI local pass-through path that carries NC-SI local pass-through packets (e.g., IP packets) from the MC to the processing element of the NC for application layer processing and an NC-SI local pass-through path that carries NC-SI local pass-through packets (e.g., IP packets) from the processing element of the NC (e.g., in response to application layer processing) to the MC via the NC-SI. The IP packets may be used with higher layer protocols such as TCP/UDP, HTTP, FTP, and NFS to provide flexible communication between the MC and the NC. The communications can be used to implement higher layer processing such as, for example, a RESTful service, firmware updates, log file transfers, and system configurations.

As with FIG. 2, FIG. 9 depicts an internal host interface 912 (e.g., PCIe) of the NC 904, an external network interface 914, and a network 916 (e.g., a LAN or WAN) that is accessed by the NC via the external network interface. The external network interface of the NC is formed at least in part by interface components 972 that include a TX, an RX, a MAC, and a PHY. As is known in the field, an interface component 974 of the NC-SI at the MC (e.g., a BMC) includes a transmit component (TX), a receive component (RX), and an NC-SI MAC and an interface component 976 of the NC (e.g., a SmartNIC) includes an NC-SI MAC, a TX, and an RX. The physical layer of the NC-SI 910 may include NC-SI over RBT, NC-SI over MCTP over SMBus/I2C, or NC-SI over MCTP over PCIe. With respect to the NC-SI, FIG. 9 illustrates TX data (TXD) from the MC to the NC as including NC-SI commands, TX pass-through packets, and TX local pass-through packets, and RX data (RXD) that includes NC-SI responses, NC-SI notifications (AENs), RX pass-through packets, and RX local pass-through packets. NC-SI commands are processed within the NC and NC-SI responses are provided to the MC, TX pass-through packets are passed from the NC-SI of the NC to the external network interface of the NC, and RX pass-through packets are passed from the external network interface of the NC to the NC-SI of the NC and eventually to the MC. Local TX pass-through packets (also referred to NC-SI local pass-through packets) are passed from the NC-SI of the NC to the application layer processing of the NC and local RX pass-through packets (also referred to as NC-SI local pass-through packets) are passed from the application layer processing of the NC to the NC-SI of the NC and eventually to the MC as described herein, the NC-SI accommodates NC-SI command/response/notification packets, NC-SI pass-through packets, and NC-SI local pass-through packets.

It should be noted that communications over the NC-SI using NC-SI local pass-through packets can coexist with communications over the NC-SI using NC-SI control packets and conventional NC-SI pass-through packets. The coexistence between communications over the NC-SI using NC-SI local pass-through packets and communications over the NC-SI using NC-SI control packets and conventional NC-SI pass-through packets is illustrated in FIG. 9. As shown in FIG. 9, NC-SI control packets (e.g., NC-SI commands and NC-SI responses) are passed between the MC 902 and the NC 904 as shown also in FIG. 2, conventional NC-SI pass-through packets are passed between the MC and the external network interface of the NC as shown also in FIG. 2, and NC-SI local pass-through packets are passed between the MC and the application layer processing of the NC in accordance with an embodiment of the invention. Such coexistence of the local pass-through traffic with conventional NC-SI traffic provides extended functionality that is in addition to the functionality already provided by an NC-SI.

Figure 10:
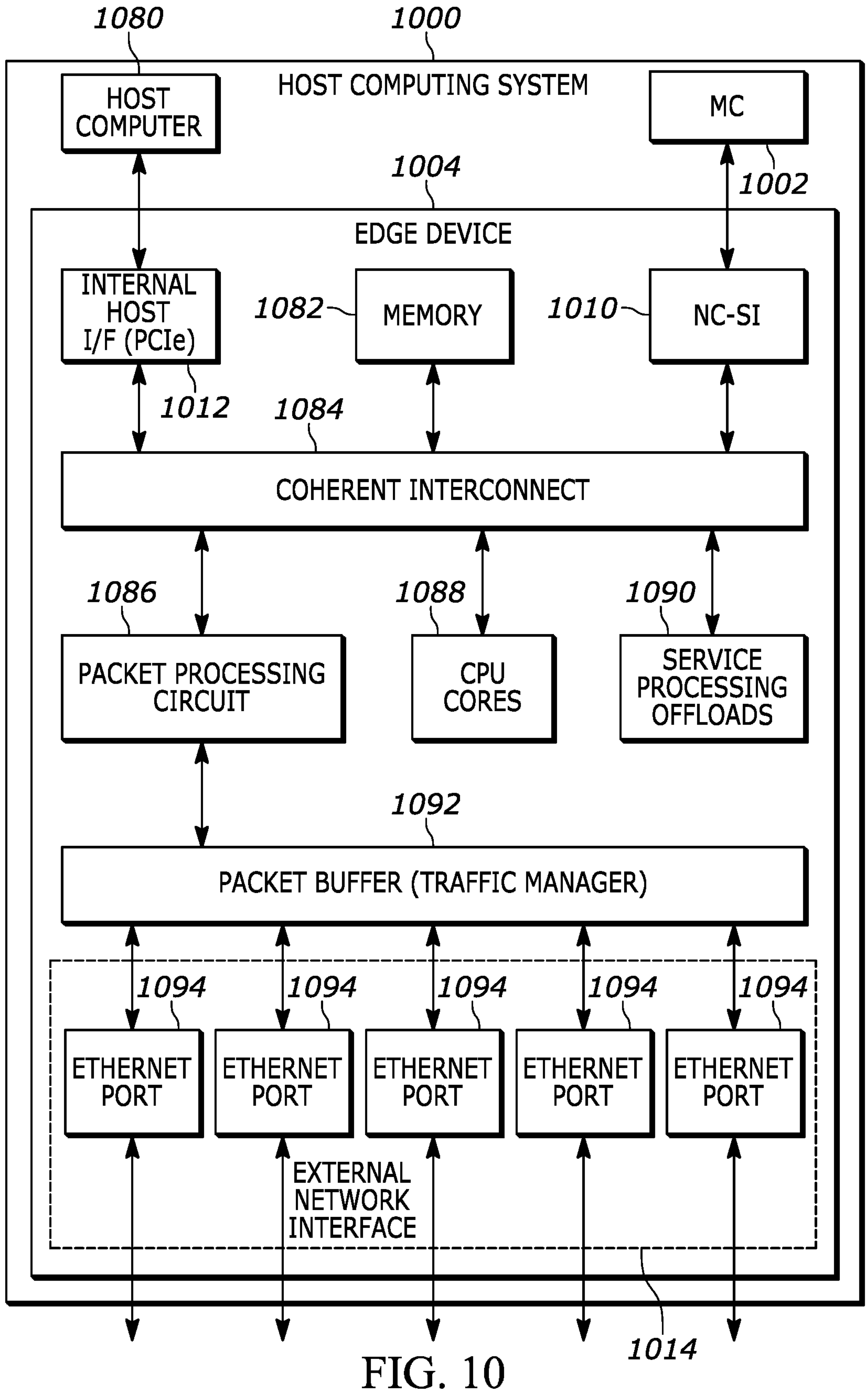
FIG. 10 depicts an example embodiment of an edge device that is configured to implement communications between an MC and the edge device using and NC-SI and IP connectivity as described herein.

In an embodiment, the NC described herein is implemented as a NIC or SmartNIC, and may be referred to generally as an "edge device." FIG. 10 depicts an example embodiment of an edge device 1004 that is configured to implement communications between an MC (e.g., a BMC) and the edge device using IP connectivity (including NC-SI local pass-through packets) as described herein. The edge device is shown relative to a host computer 1080 and an MC 1002, in which the edge device, the host computer, and the MC form a host computing system 1000. In the embodiment of FIG. 10, the edge device is a NIC (also referred to as a "SmartNIC") that is configured to operate within the host computing system in which the host computer provides storage and/or compute resources. In other embodiments, the edge device may be single IC device, such as packet processor IC device, in which case the edge device may not include certain elements such as physical layer (PHY) elements (e.g., PHY transmitters/receivers and port connectors), additional memory, power management etc., which are typically part of a NIC. In another embodiment, the edge device can be a network node, separated from the host, but directly (e.g., via a Top of Rack (ToR) switch) or indirectly (e.g., via some other switch or router in the network in the vicinity of the host) attached to the host through a network interface (e.g., an Ethernet interface). The edge device may also be implemented as a switch, router, or other network appliance.

In the example of FIG. 10, the edge device 1004 includes an internal host interface 1012, an NC-SI 1010, and an external network interface 1014 along with a memory 1082, a coherent interconnect 1084, a packet processing circuit 1086, CPU cores 1088, service processing offloads 1090, and a packet buffer 1092. Although an example architecture of the edge device is described with reference to FIG. 10, other architectures of the edge device are possible. In an embodiment, the internal host interface 1012 of the edge device 1004 is a PCIe interface that provides a high speed connection to the host computer 1080 and the external network interface 1014 includes multiple ports, such as Ethernet ports 1094, that enable the edge device to communicate with other computing systems via network connections. In an embodiment in which the edge device is a NIC, the PCIe interface may include a PCIe port with a physical layer (PHY) interface and connector, and the Ethernet ports may include physical layer Ethernet ports and connectors, which may be, for example, optical PHY ports and/or twisted-pair PHY ports. In an embodiment in which the edge device is a single IC device, the internal host interface may include pins on the IC device that correspond to a PCIe physical interface and the network interface may include pins on the IC device that correspond to MAC level Ethernet communications. In the example, of FIG. 10, the NC-SI 1010 utilizes an RMII physical interface (e.g., RBT) between the MC and the edge device. However, in other embodiments, the NC-SI may be implemented as NC-SI over MCTP over SMBus/I2C (e.g., as defined in the Management Component Transport Protocol (MCTP) SMBus/I2C Transport Binding Specification, Document Identifier: DSP0237, Date: Apr. 4, 2020, Version: 1.2.0) or NC-SI over MCTP over PCIe VDM (e.g., as defined in the Management Component Transport Protocol (MCTP) PCIe VDM Transport Binding Specification, Document Identifier: DSP0238, Date: Nov. 29, 2018, Version: 1.1.0).

The memory 1082 of the edge device 1004 can include memory for running Linux or some other operating system, memory for storing data structures such as flow tables, statistics, and other analytics, and memory for providing buffering resources for advanced features including TCP termination and proxy, deep packet inspection, and storage offloads. The memory may include a high bandwidth module (HBM) that may support, for example, 4 GB capacity, 8 GB capacity, or some other capacity depending on package and HBM. Memory transactions in the edge device, including host memory, on board memory, and registers may be connected via the coherent interconnect 1084. In one non-limiting example, the coherent interconnect can be provided by a network on a chip (NOC) "IP core". Semiconductor chip designers may license and use prequalified IP cores within their designs. Prequalified IP cores may be available from third parties for inclusion in IC devices produced using certain semiconductor fabrication processes.

In an embodiment, the packet processing circuit 1086 implements a programmable packet processing pipeline that is programmable using a domain-specific language. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019, which is incorporated by reference herein. P4 (also referred to herein as the "P4 specification," and the "P4 language") is designed to be implementable on a large variety of targets including programmable NICs, software switches, hardware switches, FPGAs, and ASICs. As described in the P4 specification, the primary abstractions provided by the P4 language relate to header types, parsers, tables, actions, match-action units, control flow, extern objects, user-defined metadata, and intrinsic metadata. The packet processing pipeline in the edge device 1004 may include an arbiter, a parser, a match-action pipeline, a deparser, and a demux/queue that constitute a P4 programmable NIC, a P4 programmable packet processor IC device, or some other architecture. The arbiter can act as an ingress unit receiving packets from RX-MACs and can also receive packets from a control plane via a control plane packet input. The arbiter can also receive packets that are recirculated to it by the demux/queue. The demux/queue can act as an egress unit and can also be configured to send packets to a drop port (the packets thereby disappear), to the arbiter via recirculation, and to the control plane via an output CPU port or via the coherent interconnect 1084. The control plane is often referred to as a CPU (central processing unit) although, in practice, control planes often execute on multiple CPU cores and other elements. The arbiter and the demux/queue can be configured through the domain-specific language (e.g., P4). In an embodiment, the packet processing circuit may implement the packet filtering function, the TX/RX processing, or some portion thereof, that is illustrated in FIG. 9.

In an embodiment, the CPU cores 1088 are general purpose processor cores, such as ARM processor cores, Microprocessor without Interlocked Pipeline Stages (MIPS) processor cores, and/or ×86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C. In an embodiment, the CPU cores are configured to implement an IP interface for IP connectivity to the MC and to execute Network Layer (e.g., OSI layer 3) processing. In an embodiment, the NC-SI command processing and/or the application layer processing is implemented via computer readable instructions executed in the CPU cores.

The service processing offloads 1090 are specialized hardware modules purposely optimized to handle specific tasks at wire speed, such as cryptographic functions, compression/decompression, etc.

The packet buffer 1092 can act as a central on-chip packet switch that delivers packets from the external network interface 1014 to packet processing elements of the edge device 1004 and vice-versa.

In an embodiment, the edge device 1004 is configured to implement communications between the MC 1002 and the edge device using IP connectivity as described herein.

Figure 11:
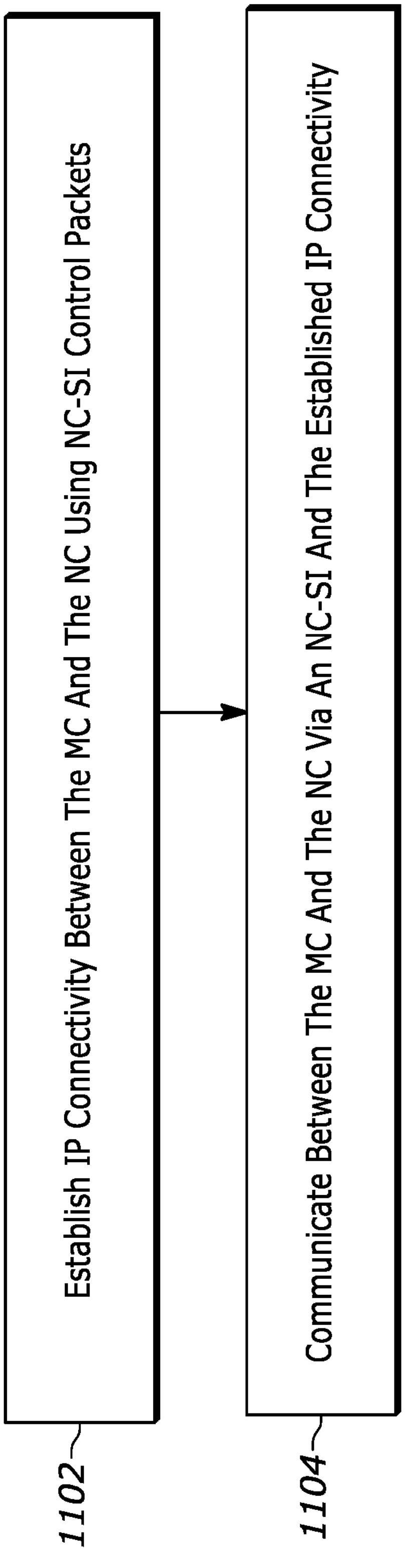
FIG. 11 is a process flow diagram of a method for implementing communications between an MC and an NC.

FIG. 11 is a process flow diagram of a method for implementing communications between an MC and an NC. According to the method, at block 1102, IP connectivity is established between the MC and the NC using NC-SI control packets. For example, IP connectivity is established as described above with reference to FIGS. 7A-7D. At block 1104, the MC and the NC communicate with each other via an NC-SI and the established IP connectivity. For example, the MC and NC use NC-SI local pass-through packets to communicate information via traditional IP connectivity. Traditional IP packets may be used with higher layer protocols such TCP/UDP, HTTP, FTP, and NFS to provide flexible communication between an MC and an NC. The communications can be used to implement, for example, a RESTful service, firmware updates, log file transfers, and system configurations.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for implementing communications between a Management Controller (MC) and a Network Controller (NC), the method comprising:

establishing Internet Protocol (IP) connectivity between the MC and the NC over a Network Controller Side-band Interface (NC-SI) using NC-SI control packets, wherein the NC-SI control packets are encapsulated in an Ethernet frame with the EtherType field set to a value of 0x88F8, and wherein information carried in the NC-SI control packets is used to establish the IP connectivity;

communicating between the MC and the NC via the NC-SI and the established IP connectivity, wherein IP connectivity between the MC and the NC involves IP packets that are communicated between an IP address of the MC and an IP address of the NC.

2. The method of claim 1, wherein establishing IP connectivity between the MC and the NC using NC-SI control packets involves passing an IP address from the MC to the NC via an NC-SI control packet.

3. The method of claim 1, wherein establishing IP connectivity between the MC and the NC using NC-SI control packets involves utilizing the NC-SI control packets to trigger IPv6 stateless autoconfiguration functionality between the MC and the NC.

4. The method of claim 1, wherein the NC-SI control packets include NC-SI command packets and NC-SI response packets.

5. The method of claim 1, wherein communicating between the MC and the NC via the NC-SI and the established IP connectivity involves transmitting packets that are encapsulated in Ethernet headers with an EtherType field set to other than an NC-SI type.

6. The method of claim 1, wherein communicating between the MC and the NC via the NC-SI and the established IP connectivity involves transmitting packets that are encapsulated in Ethernet headers with an EtherType field set to a value other than 0x88F8.

7. The method of claim 1, wherein communicating between the MC and the NC via the NC-SI and the established IP connectivity involves implementing a RESTful service between the MC and NC via the NC-SI and the established IP connectivity.

8. The method of claim 7, wherein the RESTful service utilizes REST API requests and REST API responses.

9. The method of claim 1, wherein communicating between the MC and the NC via the NC-SI and the established IP connectivity involves communicating a firmware image update from the MC to the NC via the NC-SI and the established IP connectivity.

10. The method of claim 9, wherein the firmware update is communicated from the MC to the NC via the NC-SI and the established IP connectivity using File Transfer Protocol (FTP).

11. The method of claim 9, wherein the firmware update is communicated from the MC to the NC via the NC-SI and the established IP connectivity using Network File System (NFS).

12. The method of claim 1, wherein communicating between the MC and the NC via the NC-SI and the established IP connectivity involves communicating a log file from the NC to the MC via the NC-SI and the established IP connectivity.

13. The method of claim 1, wherein NC-SI packets are communicated between the MC and the NC using NC-SI over Reduced Media Independent Interface (RMII).

14. The method of claim 1, wherein NC-SI packets are communicated between the MC and the NC using NC-SI over Reduced Media Independent Interface (RMII) based transport (RBT).

15. The method of claim 1, wherein NC-SI packets are communicated between the MC and the NC using NC-SI over MCTP over I2C.

16. The method of claim 1, wherein NC-SI packets are communicated between the MC and the NC using NC-SI over MCTP over PCIe.

17. A system for implementing communications between a Management Controller (MC) and a Network Controller (NC), the system comprising:

a processor; and a computer readable medium that stores instructions, which when executed by the processor, implement:

establishing IP connectivity between the MC and the NC over a Network Controller Sideband Interface (NC-SI) using NC-SI control packets, wherein the NC-SI control packets are encapsulated in an Ethernet frame with the EtherType field set to a value of 0x88F8, and wherein information carried in the NC-SI control packets is used to establish the IP connectivity;

communicating between the MC and the NC via the NC-SI and the established IP connectivity, wherein IP connectivity between the MC and the NC involves IP packets that are communicated between an IP address of the MC and an IP address of the NC.

18. A network controller (NC), the NC comprising:

an internal host interface;

an external network interface;

a Network Controller Sideband Interface (NC-SI); and a processing element configured to:

establish IP connectivity with a Management Controller (MC) over the NC-SI using NC-SI control packets, wherein the NC-SI control packets are encapsulated in an Ethernet frame with the EtherType field set to a value of 0x88F8, and wherein information carried in the NC-SI control packets is used to establish the IP connectivity; and communicate with the MC via the NC-SI and the established IP connectivity, wherein IP connectivity between the MC and the NC involves IP packets that are communicated between an IP address of the MC and an IP address of the NC.

* * * * *